United States Patent [19]

Sugiura

[11] Patent Number: 5,276,780
[45] Date of Patent: Jan. 4, 1994

[54] FILING SYSTEM

[75] Inventor: Masamichi Sugiura, Osaka, Japan

[73] Assignee: Minolta Camera Kabushiki Kaisha, Osaka, Japan

[21] Appl. No.: 675,050

[22] Filed: Mar. 25, 1991

Related U.S. Application Data

[63] Continuation of Ser. No. 163,845, Mar. 3, 1988, abandoned.

[30] Foreign Application Priority Data

| Mar. 3, 1987 | [JP] | Japan | 62-47925 |
| Mar. 3, 1987 | [JP] | Japan | 62-47926 |
| Mar. 3, 1987 | [JP] | Japan | 62-47927 |
| Mar. 3, 1987 | [JP] | Japan | 62-47928 |
| Mar. 3, 1987 | [JP] | Japan | 62-47929 |

[51] Int. Cl.⁵ ............................................. G06F 15/20
[52] U.S. Cl. .................................. 395/116; 395/115; 395/139; 395/166
[58] Field of Search ................ 364/200; 340/747, 750; 400/63, 76, 279, 708, 708.1; 395/139, 150, 151, 115, 116, 164, 165, 166

[56] References Cited

U.S. PATENT DOCUMENTS

| 4,442,495 | 4/1984 | Sukonick | 364/521 |
| 4,532,602 | 7/1985 | DuVall | 364/577 |
| 4,601,003 | 7/1986 | Yoneyama et al. | 364/518 |
| 4,618,937 | 10/1986 | Elias et al. | 364/518 |
| 4,648,042 | 3/1987 | Staiger | 364/486 |
| 4,742,485 | 5/1988 | Carlson et al. | 364/900 |
| 4,755,955 | 7/1988 | Kimura et al. | 364/518 |
| 4,769,852 | 9/1988 | Hashimoto et al. | 382/45 |
| 4,778,288 | 10/1988 | Nakamura | 400/76 |
| 4,779,210 | 10/1988 | Katsura et al. | 364/521 |

Primary Examiner—Phu K. Nguyen
Attorney, Agent, or Firm—Burns, Doane, Swecker & Mathis

[57] ABSTRACT

Data filing system for filing documents in a data file memory as image data is disclosed. The data filing system includes means for registering each document size in the data file memory together with image data, an output means for outputting an image of a designated document, an input means for designating an output size of the designated document and means for warning when the designated output size is different from the registered document size.

11 Claims, 10 Drawing Sheets

FILING SYSTEM

This application is a continuation, of application Ser. No. 07/163,845, filed Mar. 3, 1988, now abandoned.

BACKGROUND OF THE INVENTION

1. Field of the Invention

The present invention relates to a filing system capable of searching a designated document information among it.

2. Description of the Prior Art

Recently, a highly systematic information society has been developed and information of large volume is generated day by day. In order to utilize such information efficiently, it is demanded to construct an efficient system in information management. In the field of patent management, an efficient system is desired for utilizing and managing voluminous patent related documents and information such as laid-open patent and/or utility model publications. Japanese patent information organization (JAPIO) is now ready to start information service in connection with laid-open patent and utility model in order to satisfy such needs as mentioned above.

In Japanese laid-open patent publications, for example No. 78251/1972 and 78255/1972, a filing apparatus is proposed. In the filing apparatus, information contained in documents is read optically by two-dimensional scanning and stored as image data in a data file memory device. When search data is input thereinto, the data file is searched at a high speed and, then, designated information is outputted on a display or as hard copies.

In the filing apparatus mentioned above, a size equal to a size of the document is assigned for memorizing a document in the data file memory as a registered size in order to utilize the data file memory efficiently. As the result of that, various sizes of image data are mixed in the memory.

Meanwhile, image data to be outputted is once transmitted from the data file memory to so called page-buffer memory upon outputting them and one unit of image data which is defined in the page memory is outputted to a display apparatus or a copy machine. An image size (output size) to be outputted can be designated by an operator.

However, if an output image size designated is different from a registered image size, some inconveniences are caused. Namely, if an output size smaller than a registered size with respect to image data to be outputted is designated, image data more than volume determined by the designated output size is transmitted to the page-buffer and, therefore, image data having been stored already outside of the designated output size in the page-buffer for composing two images might be destroyed by the image data transmitted thereto, since the data transmission from the data file memory to the page-buffer is controlled in the above mentioned filing apparatus in accordance with the registered size irrespective of the designated output size. Further, if the image data is written into the designated area of the page-buffer from the top address thereof, bottom portion of the image data is not entered.

On the contrary to the above, if an output image size larger than a registered image size is designated, image data other than those to be outputted is outputted together with the latter.

SUMMARY OF THE INVENTION

One object of the present invention is to provide a filing system being capable of avoiding a possible destroy of data even if an output image size different from a registered size of image data is designated.

Another object of the present invention is to provide a filing system being capable of warning when an output image size different from a registered size of image data is designated.

BRIEF DESCRIPTION OF DRAWINGS

These and other objects and features of the present invention will become more apparent when the preferred embodiment of the present invention is described in detail with reference of accompanied drawings in that.

DESCRIPTION OF THE PREFERRED EMBODIMENT

Figure 1:
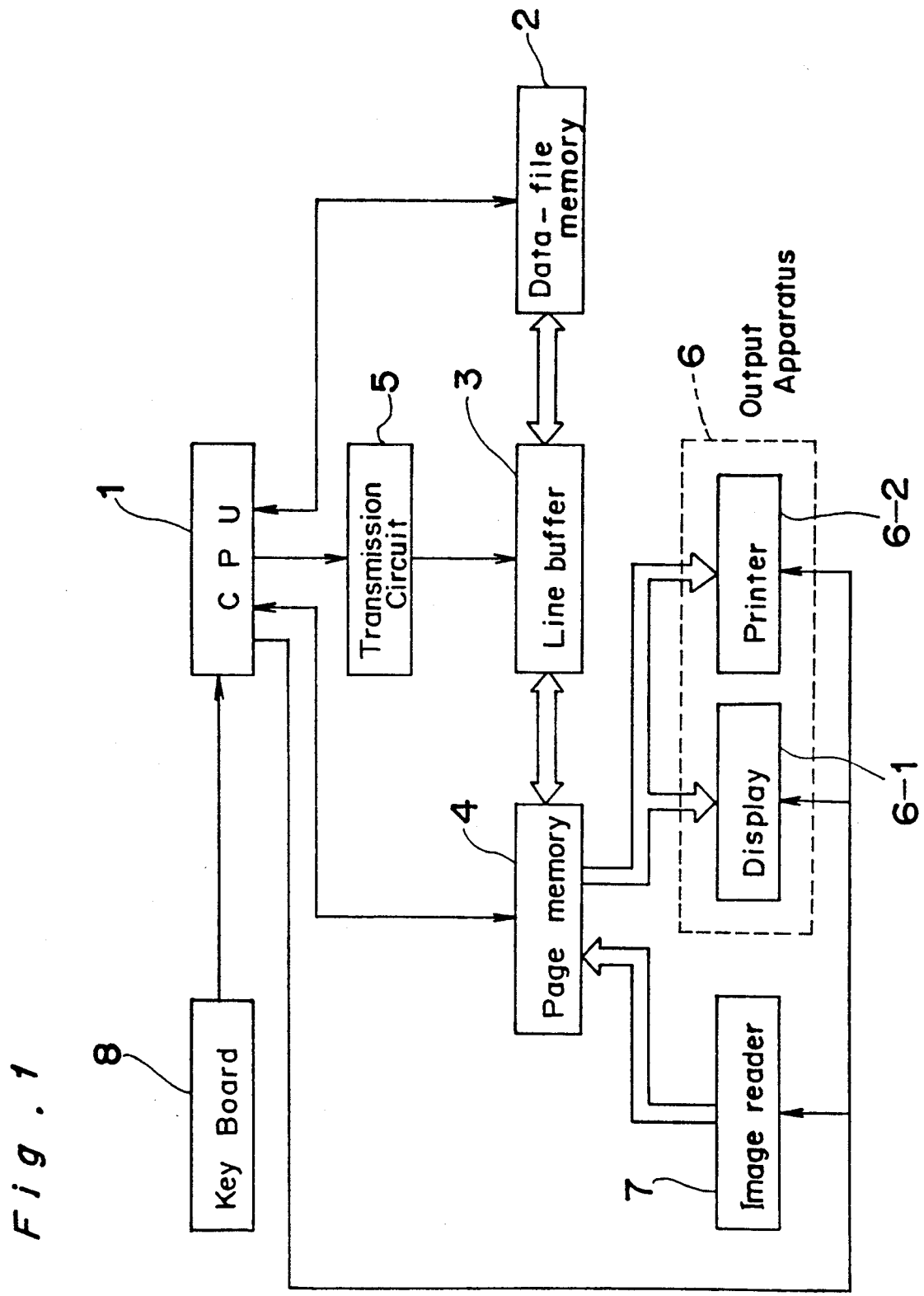
FIG. 1 is a block diagram showing composition of a filing system according to the present invention.

Referring now figures attached, FIG. 1 shows a block diagram of a data filing system according to the present invention.

The data filing system is comprised of a central processing unit (CPU) 1, a data file memory device 2 controlled by CPU1, a line buffer 3, a page memory 4, a transmission circuit 5 for controlling the line buffer 3, an output apparatus 6 including a display device 6-1 and a printer 6-2, an image reader 7 for reading documents and a key board 8 for operating the data filing system and for entering necessary data.

The data file memory device 2 is a memory device having a big volume such as an optical disk apparatus or a magnetic disk apparatus for memorizing documents as image data. The image reader 7 reads each document to be stored in the data file memory device 2 by two-dimensional optical scan and sends image data having been read into the page memory 4, via the line buffer 3, to the data file memory device 2. The image reader 7 detects also a size of the document and sends data thereof to the data file memory device 2 in order to register the size data together with the image data therein. In the output mode of the filing system, every one line of image data having been registered is outputted to the line buffer 3 sequentially.

The line buffer 3 is controlled by the transmission circuit 5 so as to memorize every one line data outputted from the data file memory 2 in the output mode of the system temporarily. Image data in each line data contained in an area necessary for display is transmitted to the page memory 4 by a command from the transmission circuit 5.

In the registration mode of the filing system, the line buffer 3 memorizes one line data sent, via the page memory 4, from the image reader 7 temporarily and, then transmits the same to the data file memory 2. Namely, the line buffer 3 compensates differences between timings of reading data from the page memory 4 and writing data into the data file memory 2. The page memory 4 has a volume capable of memorizing image data of at least one page of full size.

The transmission circuit 5 controls data transmission between the data file memory 2 and the page memory 4 via the line buffer 3. The data transmission in the output mode is performed based on a relation between a document size having been registered in the data file memory 2 and an output (display) size having been designated in connection with the page memory 4, as will be stated in detail hereafter.

Figure 2:
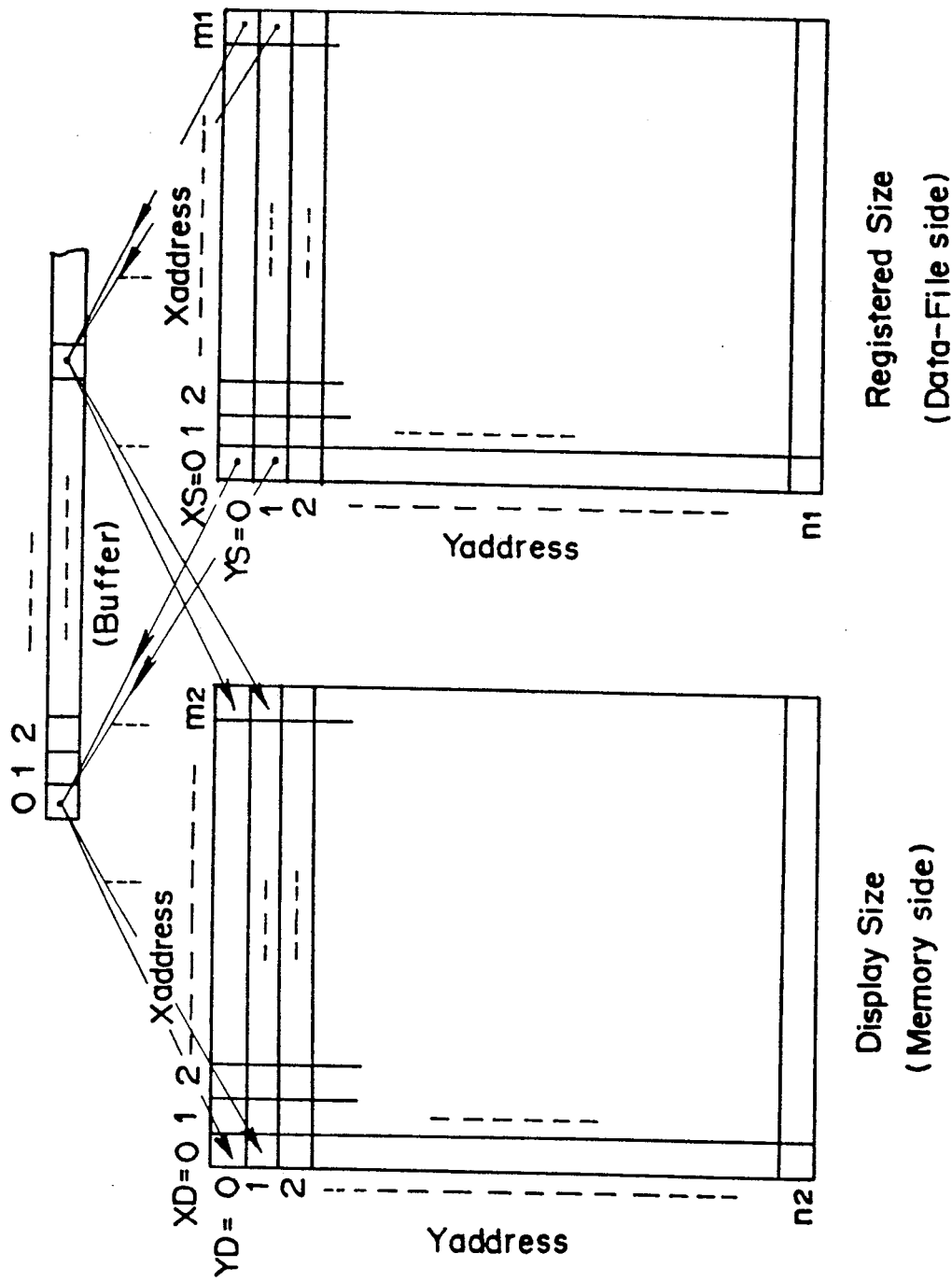
FIGS. 2, 3 and 4 are explanative views for showing individual relation between registered document image and displayed image, respectively.
Figure 3:
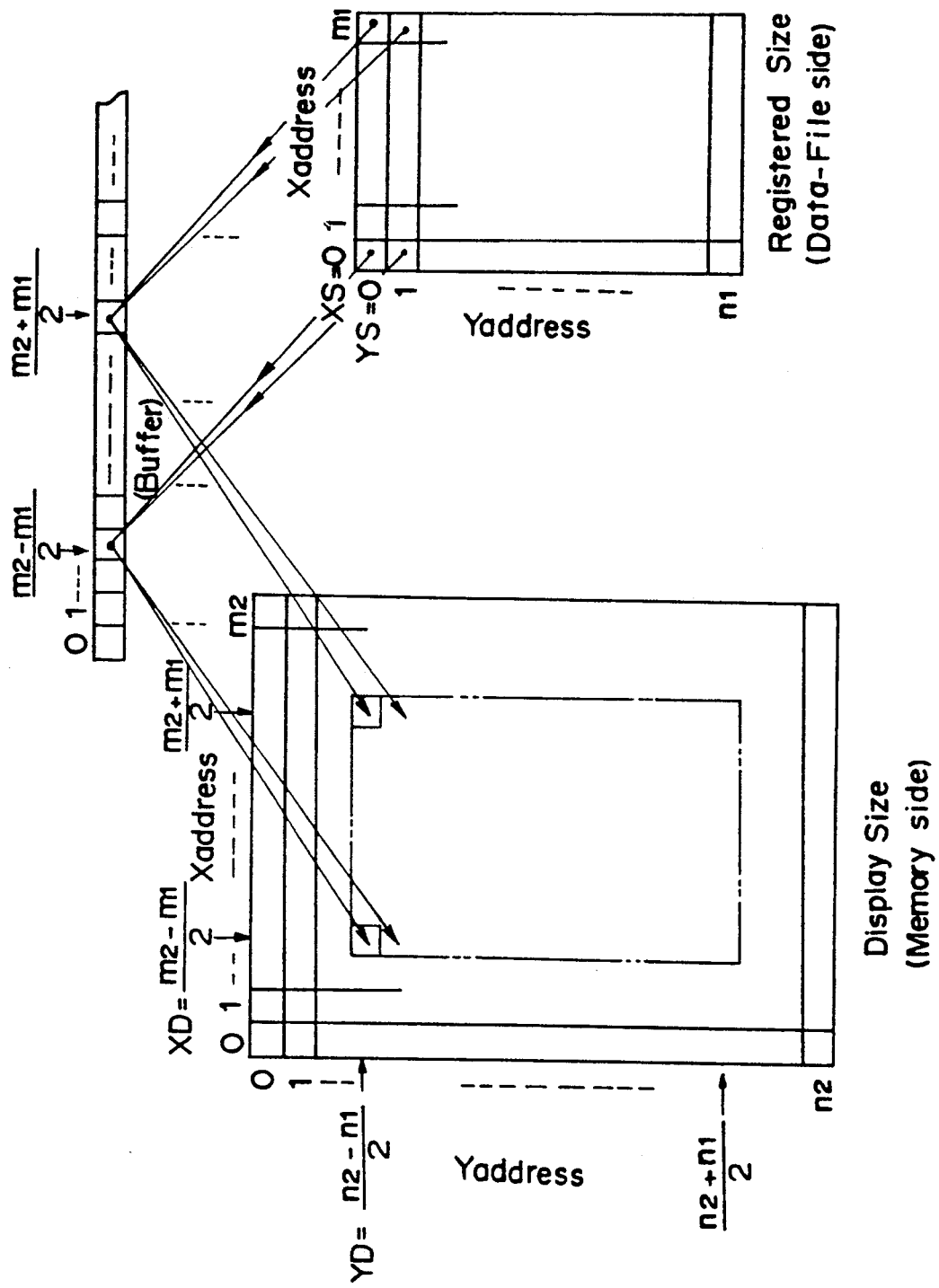
Figure 4:
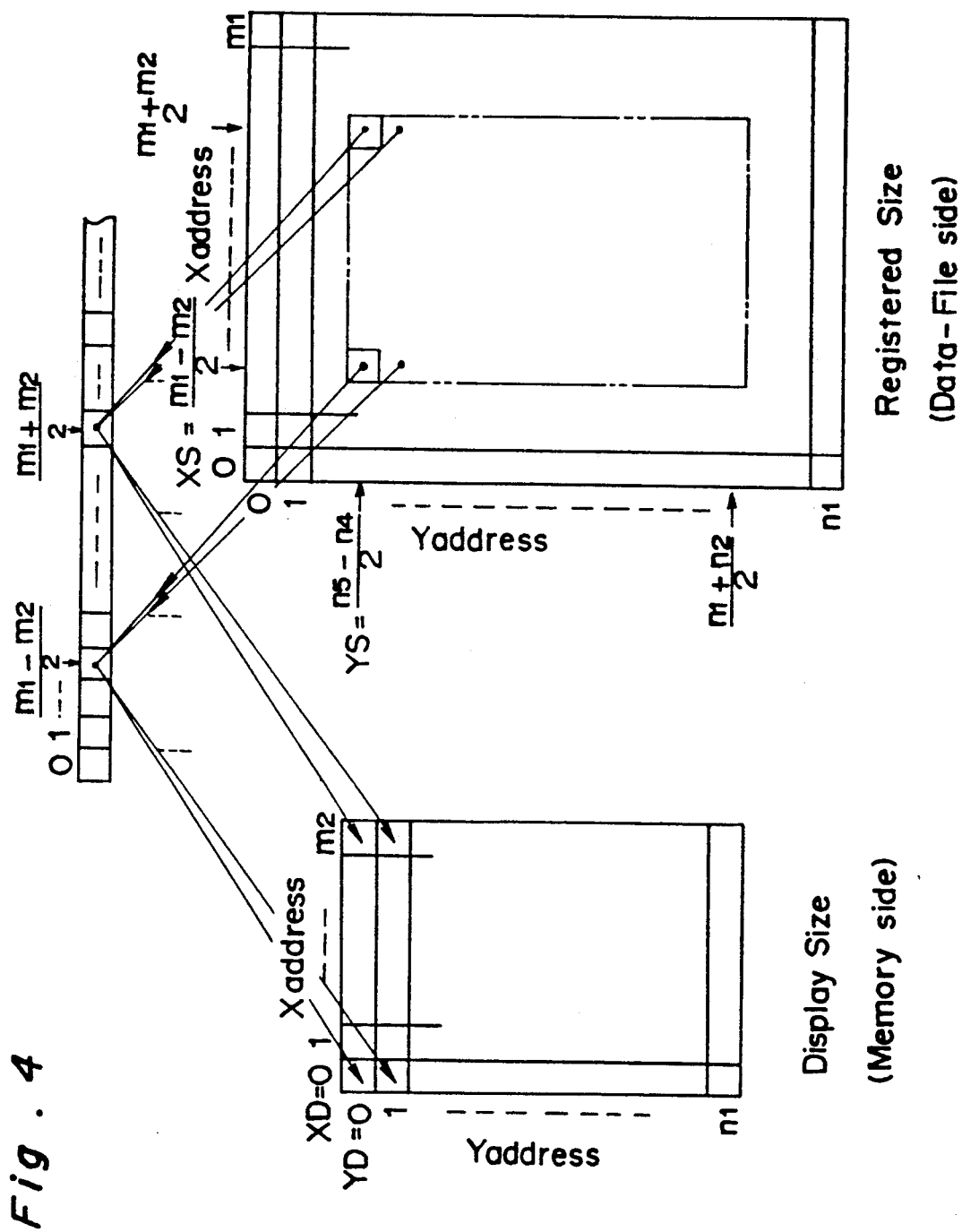

FIGS. 2, 3 and 4 show respective manners for writing image data into the page memory 4 according to the relation between the registered size and the display size.

In these FIGS. numbers 0, 1, 2, ..., $m_1$ denote individual addresses in X direction of image data scanned by the image reader 7 and registered in the data file memory 2 and numbers 0, 1, 2, ..., $n_1$ denote addresses in Y direction corresponding to respective count numbers $Y_{CNT}$ each of which represents a number of times of scannings in X direction. Also, numbers 0, 1, 2, ..., $m_2$ denote addresses in X direction of the page memory 4 and numbers 0, 1, 2, ..., $n_2$ denote addresses in Y direction of the same.

In FIG. 2, the registered size coincides with the display size, namely $m_1 = m_2$ and $n_1 = n_2$. In FIG. 3, the registered size is smaller than the display size, namely $m_1 < m_2$ and $n_1 < n_2$. In FIG. 4, the former is larger than the display size, namely $m_1 > m_2$ and $n_1 > n_2$.

As is easily understood when FIGS. 2, 3 and 4 are referred to, the data transmission from the data file memory 2 to the page memory 4 is controlled by following factors:

XS ... X address of image data in a registered document image from which the data transmission is started,
YS ... Y address of the same,
XL ... Amount of data in one line data to be transmitted in X direction,
YL ... Number of line data to be transmitted,
XD ... X address of a point in the page memory 4 at which transmitted data is accessed at first, and
YD ... Y address of the same.

These control factors XS, YS, XL, YL, XD and YD are determined by CPU1 according to a control program for the data transmission, as will be stated hereafter. The output apparatus 6 outputs image information stored in the page memory 4 by displaying it on the CRT display 6-1 or by the printer 6-2.

CPU1 provides a main routine program, a processing routine program for size alteration, a read processing routine program, a registration routine program and a print processing routine program.

Hereafter, these routine programs will be explained referring flow-charts shown in FIGS. 5, 6, 7, 8, 9 and 10.

(Main routine program)

Figure 5:
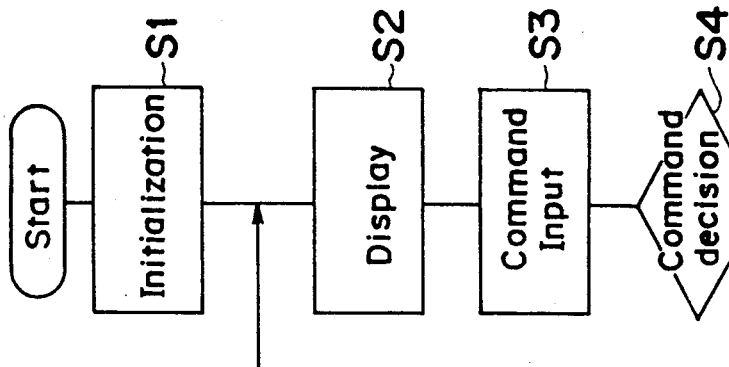
FIG. 5 is a flow-chart showing the main rout program to be executed by CPU provided in the filing system according to the present invention.

FIG. 5 shows a flow-chart for the main routine program.

When CPU1 is reset, the program is started. At step S1, the page memory 4 is initialized and the display size is also initialized. At step S2, contents of the initialized page memory 4 are outputted to the output apparatus 6 to display it in the initialized size on the display 6-1.

When the initialized image is displayed on the display 6-1, an operator designates a display size with use of the key board 8 and enters a command for either of the read processing, the registration processing and the print processing at step S3.

When the command is entered, CPU1 identifies the kind thereof, at step S4, to select a routine program to be executed. If it is a command for the size alteration, the routine program (step S5) for the size alteration is selected. If it is a command for the read processing, the routine program (step S6) for the read processing is selected. Similarly, if it is a command for the registration processing, the routine program (step S7) for the registration processing is selected and the routine program (step S8) for the print processing is selected if it is a print command. When the selected routine program has been executed, CPU1 returns to step S2.

(Size alteration routine)

Figure 6:
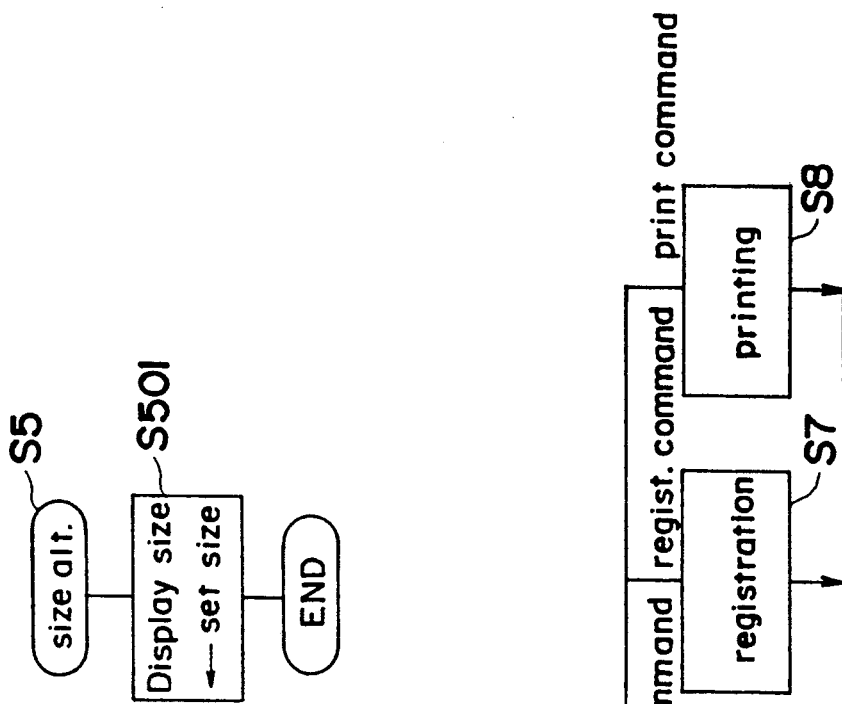
FIG. 6 is a flow-chart of the size alteration program according to the present invention.

FIG. 6 shows a flow-chart for the size alteration routine program. In this routine S5, at step S501, the output size is altered from one set previously to another one presently designated at step S3.

(Read processing routine)

Figure 7:
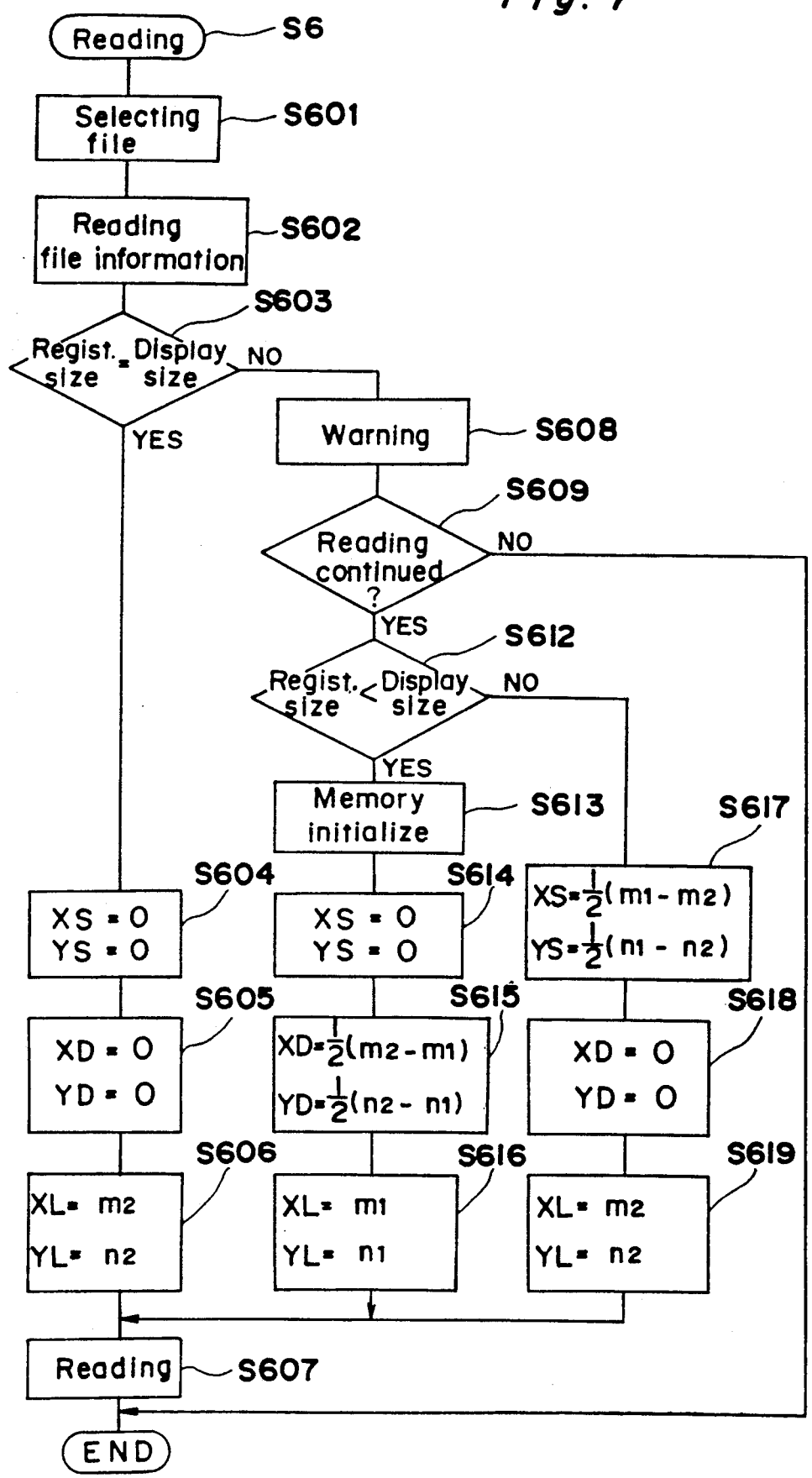
FIG. 7 is a flow-chart of the read routine according to the present invention.

FIG. 7 shows a flow-chart of the read processing routine program (S6). In this routine, a document file is searched in the data file memory 2 according to input data for identifying it.

Namely, when an operator enters the identification data to select the desired document file at step S601, CPU1 searches it in the data file memory 2 to find it together with the registered managing information thereof at step S602. And, CPU1 decides whether the registered size is equal to the designated output size at step S603. If it is decided that the former is equal to the latter at step S603, both of XS and YS are set equal to zero at step S604, and both of XD and YD are set equal to zero at step S605. Then, XL and YL are set equal to $m_2$ and $n_2$ of the designated display size at step S606, respectively. After these steps, a read subroutine S607 is executed. In this case, all of image data contained in the document are read out to transmit them to the page memory 4. Therefore, the registered document image is displayed as a whole as shown in FIG. 2.

If it is decided that the former is different from the latter at step S603, CPU1 commands to indicate or warn it on the CRT display 6-1 at step S608. The operator can recognize that the registered size of the document is not equal to the designated output size from the indication or the warning indicated. Upon warning, it may be convenient to indicate the registered size of the document together with the warning.

After that, it is decided, at step S609, whether the read processing is to be continued or not according to a proper command entered from the key board 8. If the operator does not want to continue the reading processsing, it is finished.

On the contrary to the above, if he wants to continue it, it is decided whether the display size is larger than the registered size of the document at step S612. If it is decided that the display size is larger than the registered size at step S612, the page memory 4 is initialized at step S613. This is because, if image data of another document has been stored, the image data is displayed around the image transmitted at this time since the display size is larger than the registered size. After initialization of the page memory 4, XS and YS are set at zero at step S614, respectively. Then, at step S615, XD and YD are set equal to $(m_2-m_1)/2$ and $(n_2-n_1)/2$, respectively. Further, XL and YL are set to $m_1$ and $n_1$ respectively at step S616. Address data $m_1$, $m_2$, $n_1$ and $n_2$ are clearly defined in FIGS. 2, 3 and 4.

After execution of those steps S614, S615 and S616, CPU1 executes the reading subroutine S607 for transmitting image data from the data file memory 2 to the page memory 4. Accordingly, image data of the registered document is transmitted into an area defined by X addresses from $(m_2-m_1)/2$ to $(m_2+m_1)/2$ and Y addresses from $(n_2-n_1)/2$ to $(n_2+n_1)/2$. Therefore, the document image is displayed in the central portion of the display as shown in FIG. 3.

If it is decided that the display size is smaller than the registered size of the document at step S612, XS and YS are set equal to $(m_1-m_2)/2$, $(n_1-n_2)/2$ at step S617, respectively. And XD and YD are set equal to zero at step S618, respectively. Further, XL and YL are set equal to $m_2$ and $n_2$ at step S619, respectively. After execution of these steps S617, S618 and S619, the read processing subroutine S617 is executed to transmit image data. According to this data transmission, image data is transmitted into an area of the page memory 4 defined by X addresses from $(m_1-m_2)/2$ to $(m_1+m_2)/2$ and Y addresses from $(n_1-n_2)/2$ to $(n_1+n_2)/2$, as shown in FIG. 4. As is easily understood from FIG. 4, almost all of the whole document image except for peripheral portion in which no substantive information is contained usually is displayed.

Figure 8:
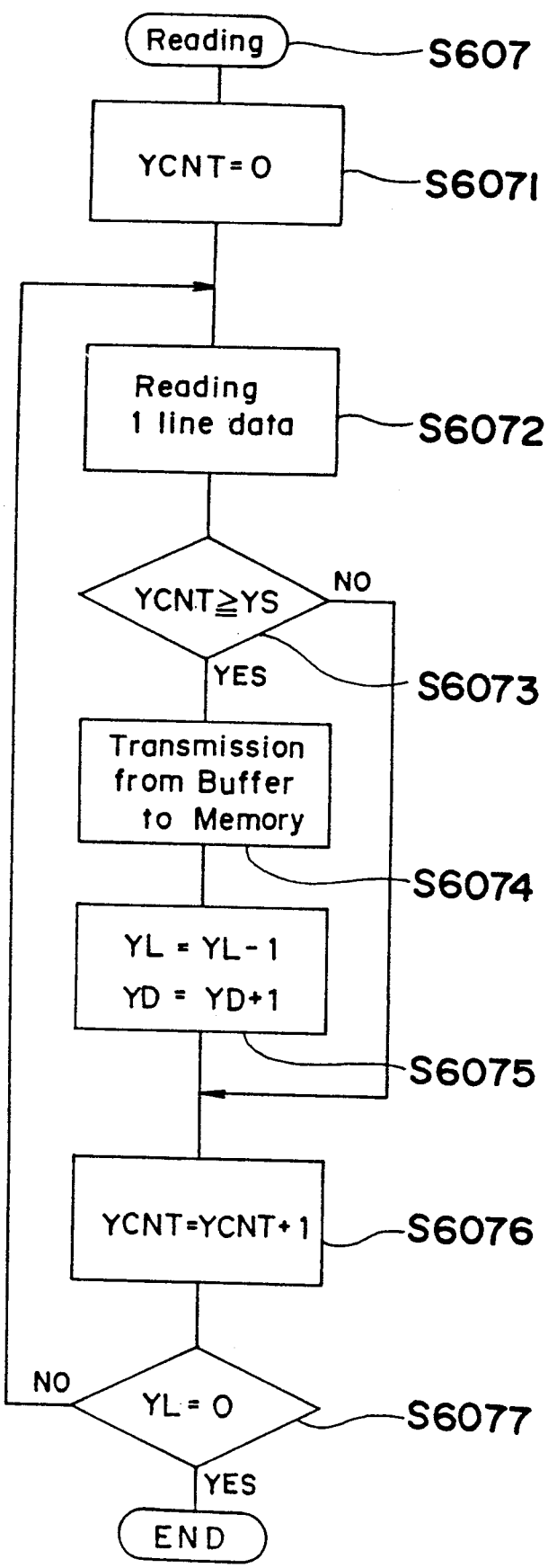
FIG. 8 is a flow-chart of the read subroutine S607 shown in FIG. 7.

FIG. 8 shows a flow-chart of the read processing subroutine S608. In this subroutine S607, $Y_{CNT}$ indicating a line number is set at zero before starting a data transmission at step S6071. Then, the data transmission is executed in unit of one line data by repeating steps from S6072 to S6077. More concretely, when $Y_{CNT}$ becomes equal to YS at step S6073, the data transmission is started at step S6074 and YL, YD and $Y_{CNT}$ are renewed as shown at steps S6075 and S6076, respectively.

When YL becomes zero, namely all of the image data to be transmitted have been transmitted from the data file memory 2 to the passage memory 4 via the line buffer 3, the read processing subroutine S607 is finished.

(Registration processing routine)

Figure 9:
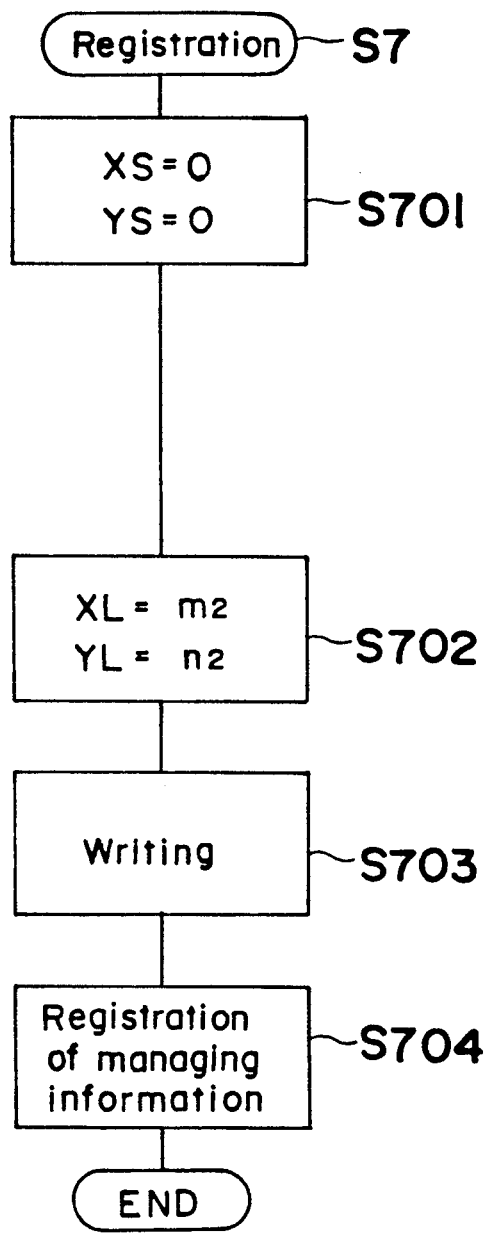
FIG. 9 is a flow-chart of the registration routine according to the present invention.

FIG. 9 shows a flow-chart thereof.

The registration of each document is done by reading it with use of the image reader 7. Image data obtained is stored in the page memory 4 once and then, sent to the data file memory 2 via the line buffer 3. Upon registration of the document, image data obtained is displayed by the display apparatus 6-1.

This routine is selected if the entered command is identified to a registration command (see steps S3 and S4 in FIG. 5). When this routine is started, XS and YS are set equal to zeros, respectively, in order to designate the top address of image data to be transmitted from the page memory at step S701.

Next, at step s702, XL and YL are set at $m_2$ and $n_2$, respectively, to designate a volume or a size to be registered. After execution of these steps S701 and S702, image data read by the image reader 7 is transmitted from the page memory 4 to the data file memory 2 via the line buffer 3 in unit of line data at step s703. Upon writing image data into the data file memory 2, the managing information such as a document size is also registered at step S704 as mentioned before.

Figure 10:
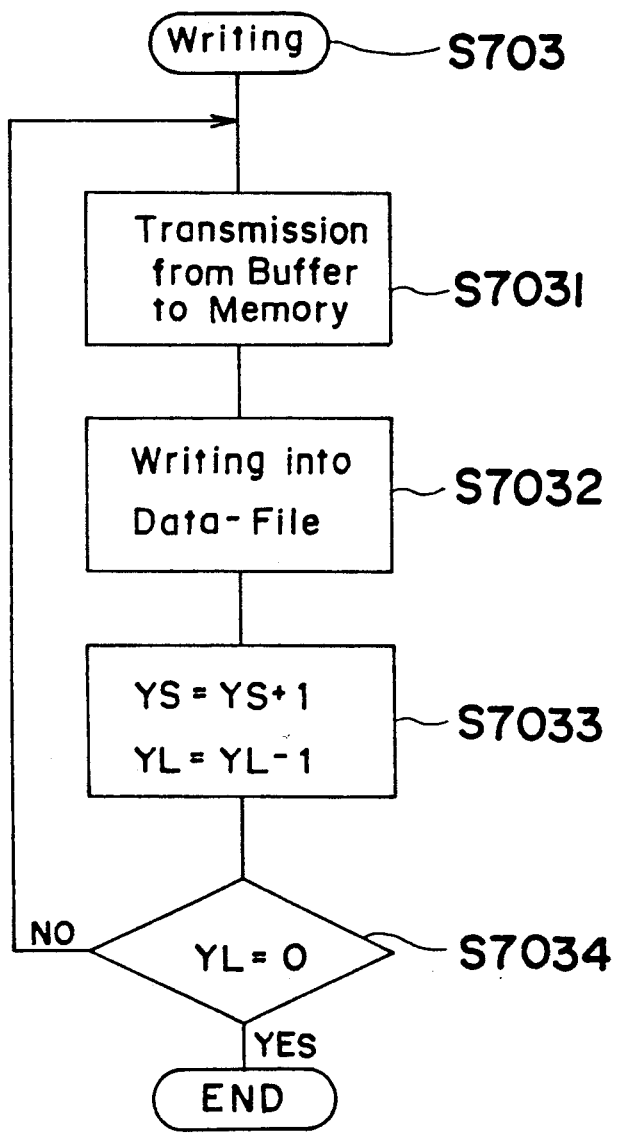
FIG. 10 is a flow-chart of the write subroutine s703 shown in FIG. 9.

The write subroutine S703 is shown in FIG. 10. In this subroutine S703, image data stored in the page memory 4 is transmitted to the line buffer 3 from the top address thereof in unit of one line at S7031 and, at step S7032, the one line data having XL data is written into the data file memory 2 from the line buffer 3. And, at step S7033, YS is incremented by one and YL is decremented by one.

When YL becomes equal to zero by repeating steps S7031 to S7033, the write processing subroutine S703 is finished.

Figure 11:
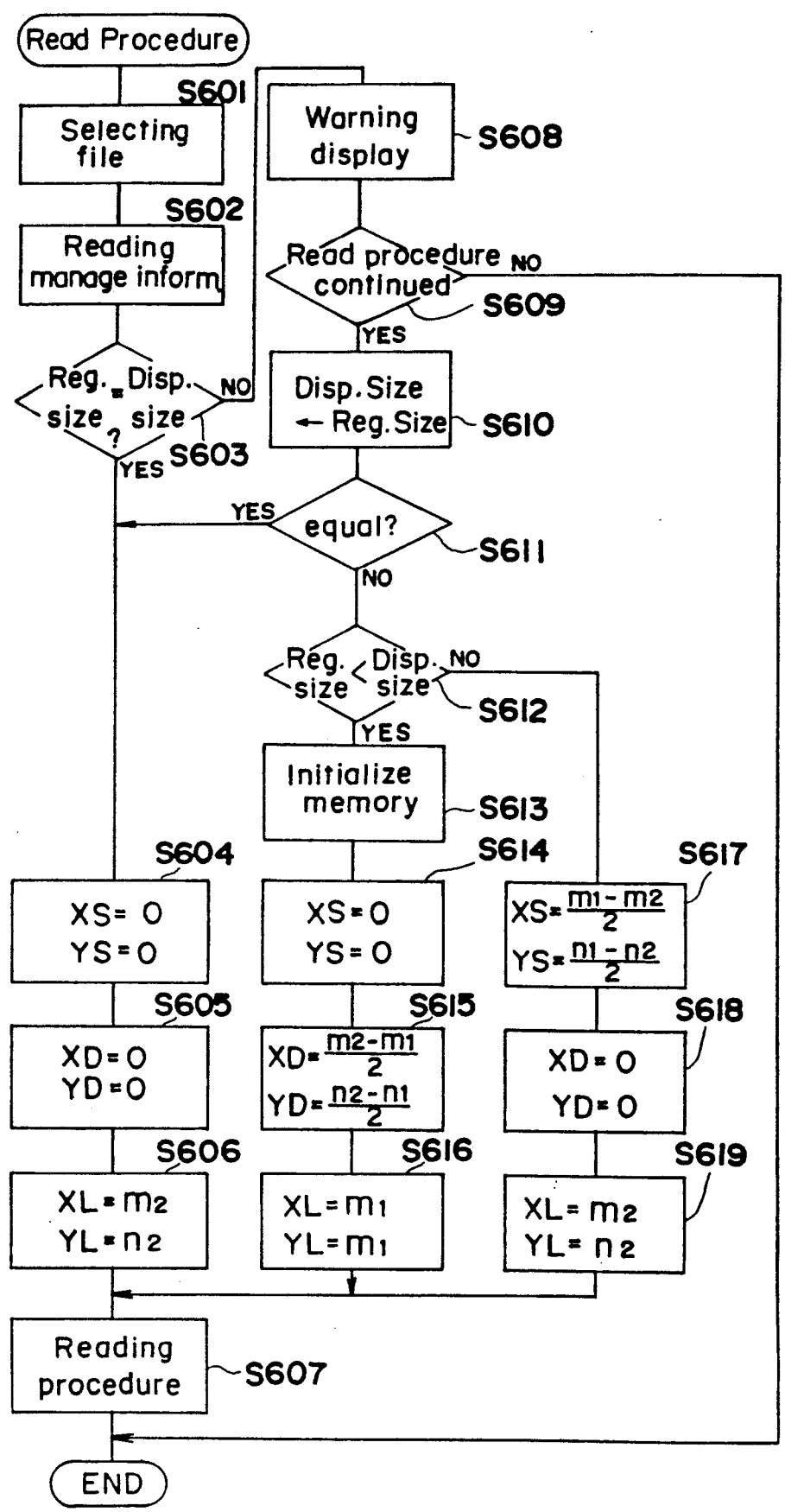
FIG. 11 is a flow-chart showing a variation of the flow-chart shown in FIG. 7.

FIG. 11 shows a variation of the read processing routine shown in FIG. 7. As is easily understood when compared FIG. 11 with FIG. 7, in the variation, steps S610 and S611 are inserted between two steps S609 and S612. Namely, if it is decided at step S609 that the read procedure is to be continued after warning at step S608, the display size is forcibly set equal to the registered size at step S610. Since both sizes become equal to each other, the program proceeds or returns from S611 to S604. All of other steps contained in FIG. 11 are same to those contained in FIG. 7.

As is easily understood from the above, steps from S612 to s619 become unnecessary in this variation. However, they are left as they are, assuming the case in that the display size available for the display or the printer is impossible to coincide with the registered size.

The preferred embodiments described herein are illustrative and not restrictive, the scope of the invention being indicated by the appended claims and all variations which come within the meanings of the claims are intended to be embraced herein.

What is claimed:

1. Data filing system wherein documents, comprising both characters and pictures, are filed as image data in a data file memory device having a large volume and desired image data is read out of the data file memory device to utilize the desired image data as information being characterized in that respective sizes of documents are registered together with the image data in the data file memory device and in comprising:

a selecting means for selecting the desired image data to be outputted, an output means for outputting the selected desired image data selected by the selecting means, which selected desired image data is filed in the memory device as information, an input means for designating an output size of the selected desired image data to be outputted by the output means, and means for warning if the designated output size of the selected desired image data is different from the document size which has been registered together with the selected desired image data in the memory device.

2. Data filing system according to claim 1 wherein the output means includes a display means capable of displaying at least a whole image of a document.

3. Data filing system according to claim 2 wherein the warning by the warning means is displayed on the display means.

4. Data filing system wherein documents, comprising both characters and pictures, are filed as image data in a data file memory device having a large volume and desired image data is read out of the memory device to utilize the desired image data as information being characterized in that respective sizes of documents are registered together with the desired image data in the data file memory device and in comprising:

a memory means for storing the desired image data temporarily which has been read out of the data file memory device, an output means for outputting the desired image data stored by the memory means, an input means for designating an output size of the desired image data to be outputted by the output means, and a write means for writing the desired image data into the memory means, wherein said write means initializes the memory means before writing the desired image data to the memory means if the document size registered in the data file memory device together with the desired image data to be outputted is smaller than the output size designated by the input means.

5. Data filing system according to claim 4 wherein the output means includes a display means capable of displaying at least a whole image of a document.

6. Data filing system wherein documents, comprising both characters and pictures, are filed as image data in a data file memory device having a large volume and desired image data is read out of the data file memory device to utilize the desired image data as information being characterized in that respective sizes of documents are registered together with the desired image data in the data file memory device and in comprising:

a selecting means for selecting the desired image data to be outputted, a memory means for temporarily storing the desired image data selected by the selecting means and which has been read out of the data file memory device, an output means for outputting the desired image data after reading the desired image data from the memory means, an input means for designating an output size of the desired image data to be outputted by the output means, and a write means for writing only a central portion of the desired image data selected by the selecting means, which central portion has been extracted therefrom so as to have the same size as the designated output size if the registered size corresponding to the desired image data to be outputted is larger than the designated output size.

7. Data filing system according to claim 6, wherein the write means includes a calculation means for calculating read start addresses and read end addresses of the desired image data to be read out in X and Y directions, respectively, in order to obtain the central portion of the desired image data of which the size is equal to the designated output size.

8. Data filing system according to claim 7, wherein the calculation means calculates the respective read start address and the read end addresses from equations as follows:

read start address in the X direction $$=(m_1-m_2)/2,$$

read end address in the X direction $$=(m_1+m_2)/2,$$

read start address in the Y direction $$=(n_1-n_2)/2 \text{ and}$$

read end address in the Y direction $$=(n_1+n_2)/2$$

wherein
- $m_1$: length in the X direction of the registered size corresponding to the desired image data to be outputted
- $m_2$: length in the X direction of the output size corresponding to the desired image data to be outputted
- $n_1$: length in the Y direction of the registered size corresponding to the desired image data to be outputted, and
- $n_2$: length in the Y direction of the output size corresponding to the desired image data to be outputted.

9. Data filing system wherein documents are filled as image data in a data file memory device having a large volume and desired image data is read out of the data file memory device to utilize the desired image data as information being characterized in that respective sizes of documents are registered together which the image data in the data file memory device and in comprising:

a selecting means for selecting the desired image data to be outputted;

an output means for outputting the selected desired image data selected by the selecting means, said selected desired image data being filed in the memory device as information;

an instructing means for instructing said output means to start operating;

an input means for designating an output size of the selected desired image data to be outputted by the output means;

a comparison means for comparing, when said output means is instructed to start operating by said instructing means, the designated output size of the selected desired image data with the document size which has been registered together with the selected desired image data in the memory device, and warning means for issuing a warning, based on the comparison by said comparison means, if the designated output size of the selected desired image data is different from the document size which has been registered together with the selected desired image data in the memory device.

10. Data filing system, wherein documents, which are optically read by an image reader, are filed as image data in a data file memory device having a large volume and desired image data is read out of the data file memory device to utilize the desired image data as information being characterized in that respective sizes of documents are registered together with the desired image data in the data file memory device and in comprising:

a selecting means for selecting the desired image data to be outputted, an output means for outputting the selected desired image data selected by the selecting means, said selected desired image data being filed in the memory device as information, an input means for designating an output size of the selected desired image data to be outputted by the output means, and means for warning if the designated output size of the selected desired image data is different from the document size which has been registered together with the selected desired image data in the memory device.

11. Data filing system wherein documents, comprising both characters and pictures, are filed as image data in a data file memory device having a large volume and desired image data is read out of the data file memory device to utilize the desired image data as information being characterized in that respective sizes of documents are registered together with the image data in the data file memory device and which comprises:

a selecting means for selecting the desired image data to be outputted, an output means for outputting the selected desired image data selected by the selecting means, which selected desired image data is filed in the memory device as information, an input means for designating an output size of the selected desired image data to be outputted by the output means, means for warning if the designated output size of the selected desired image data is different from the document size which has been registered together with the selected desired image data in the memory device, and means for changing the designated output size to the registered size when a command demanding an output is entered from the input means after the warning by the warning means.

* * * * *